Nov. 17, 1925.  
A. DAVIS, JR., ET AL  
VEHICLE TANK  
Filed May 15, 1920  
1,562,300  
4 Sheets-Sheet 2

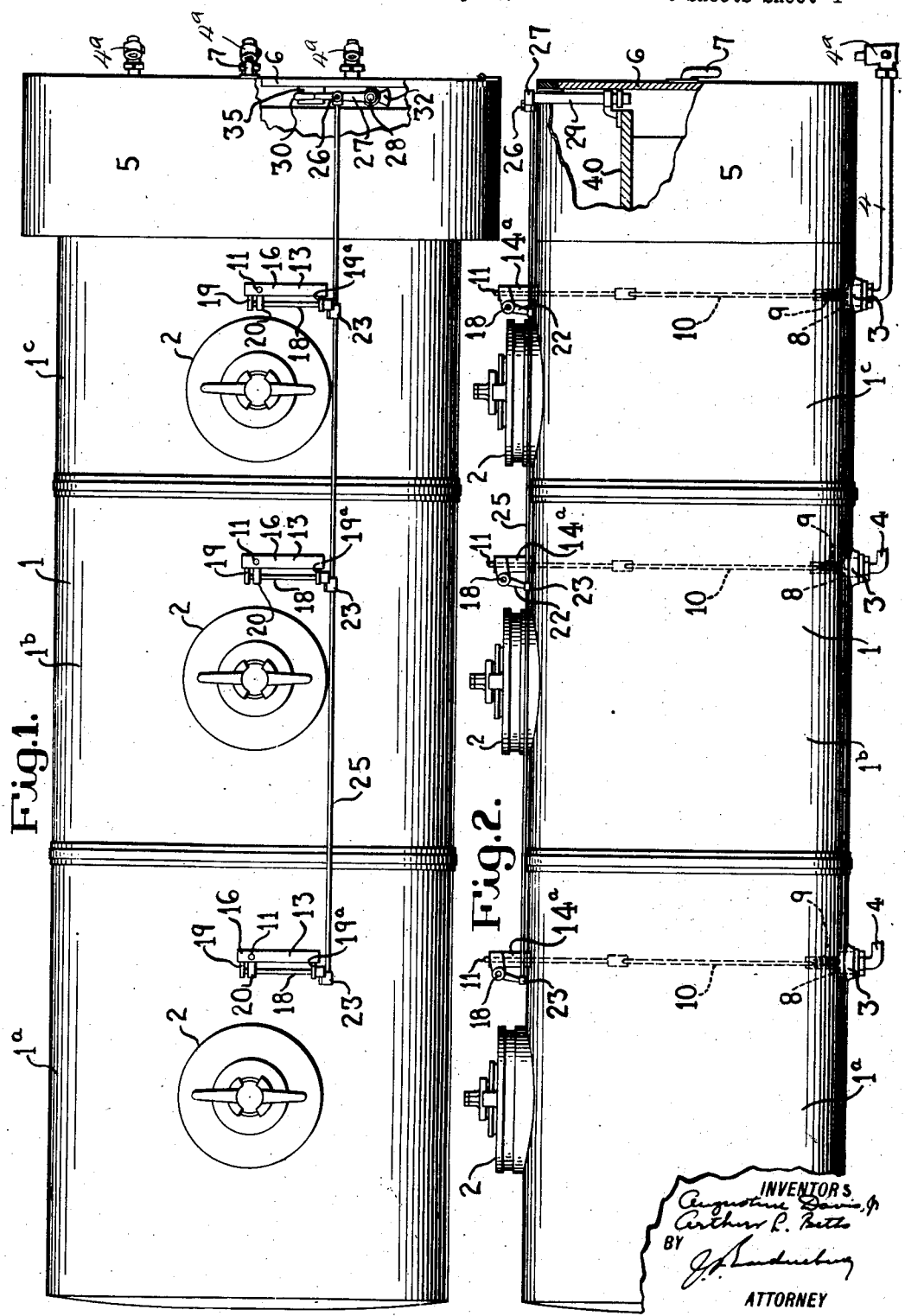

INVENTORS  
Augustine Davis, Jr.  
Arthur L. Betts  
BY  
ATTORNEY

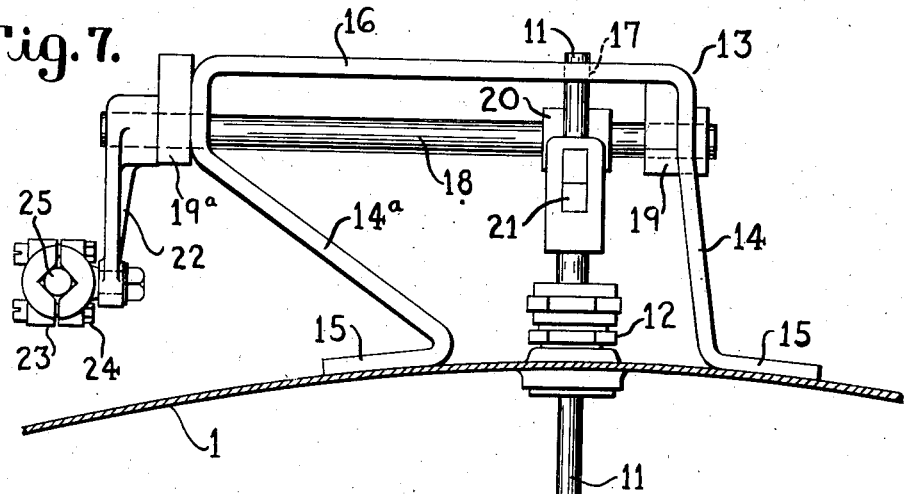
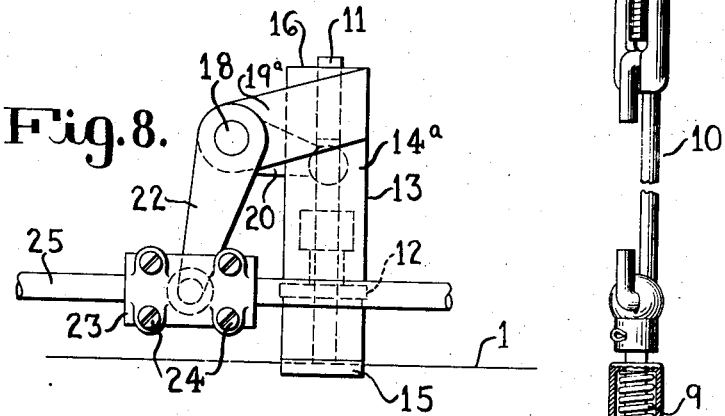
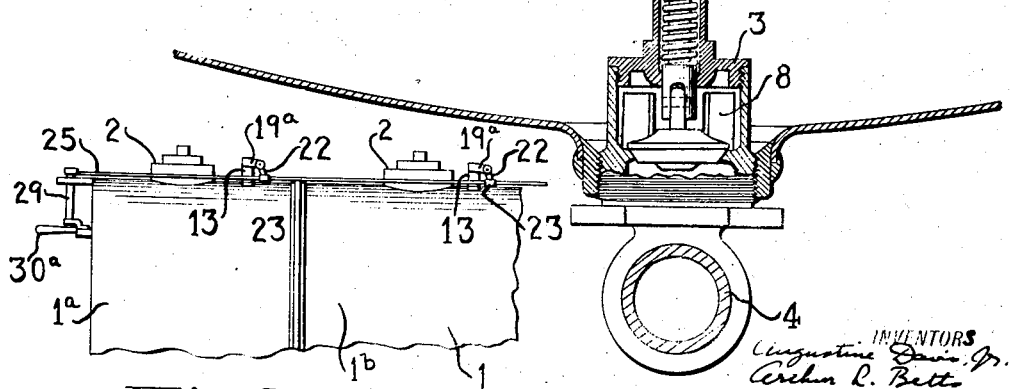

Nov. 17, 1925.

A. DAVIS, JR., ET AL 1,562,300

VEHICLE TANK

Filed May 15, 1920 4 Sheets-Sheet 4

INVENTORS

ATTORNEY

Patented Nov. 17, 1925.

1,562,300

UNITED STATES PATENT OFFICE.

AUGUSTINE DAVIS, JR., OF COVINGTON, KENTUCKY, AND ARTHUR L. BETTS, OF CINCINNATI, OHIO; SAID BETTS ASSIGNOR TO SAID DAVIS.

VEHICLE TANK.

Application filed May 15, 1920. Serial No. 381,575.

*To all whom it may concern:*

Be it known that we, AUGUSTINE DAVIS, Jr., and ARTHUR L. BETTS, citizens of the United States, and residents, respectively, of Covington, in the county of Kenton and State of Kentucky, and of Cincinnati, in the county of Hamilton and State of Ohio, have invented certain new and useful Improvements in Vehicle Tanks, of which the following is a specification.

The invention relates to vehicle tanks, such as those of oil tank wagon and trucks. These tanks usually have several compartments for different kinds of oil and gasoline, and pipes lead from bottom outlets in the compartments to rear faucets from which the buckets are filled. It is customary to have the bottom outlets guarded by emergency valves in the tank, and it is desirable that these valves be closed when the vehicle is moving from place to place and at other times when oil is not to be withdrawn, in order to prevent escape in event of damage to the faucets. At the rear end of the tank, above the faucets, is a bucket-box in which the buckets and accessories are kept. The object of this invention is to insure the emergency valves being closed at the proper times, and to prevent unauthorized opening thereof and theft of oil. To this end operating connections are provided passing from the valves to the bucket-box, where there is an interlock with the door of the box so that the valves must be closed in order that the door may close. This the driver will do whenever he finishes drawing oil and puts the bucket in the box preparatory to moving. A lock for the door will then lock all the buckets and funnels, and also all the emergency valves, and consequently all the pipe lines, against loss or theft. The interlock may be of various forms.

The invention also comprises the operating connections, generally and specifically, and the combination of the same with the tank and valves, and means at the end of the tank for operating the valves from the ground or from the cab, instead of from the top of the tank as usual. Furthermore, the invention comprises the arrangement whereby all the valves can be closed at once, by a common agency, which is important in case of accident.

In the accompanying drawings forming a part hereof:

Fig. 1 is a plan view of a vehicle tank with a portion of the top of the bucket-box at the rear end of the tank broken away to reveal parts within, and with the handle constituting a member of the operating connections and the cooperating door in closed position;

Fig. 2 is a side elevation corresponding to Fig. 1, with a portion of the side of the bucket-box broken away to show interior parts and with two of the pipe lines which extend rearward to the faucets also broken away;

Fig. 7 is an enlarged, tranverse, vertical section through the tank, partially illustrated, showing one of the emergency valves in section in closed position, and with the upwardly extending valve rod in action and the parts on top of the tank cooperating therewith in elevation;

Fig. 8 is a side elevation of the parts on top of the tank seen in Fig. 7;

Fig. 9 is an elevation of the upper and forward part of the tank, illustrating the valve controlling means passing to the front end of the tank, where they can be controlled from the cab;

Figure 3:
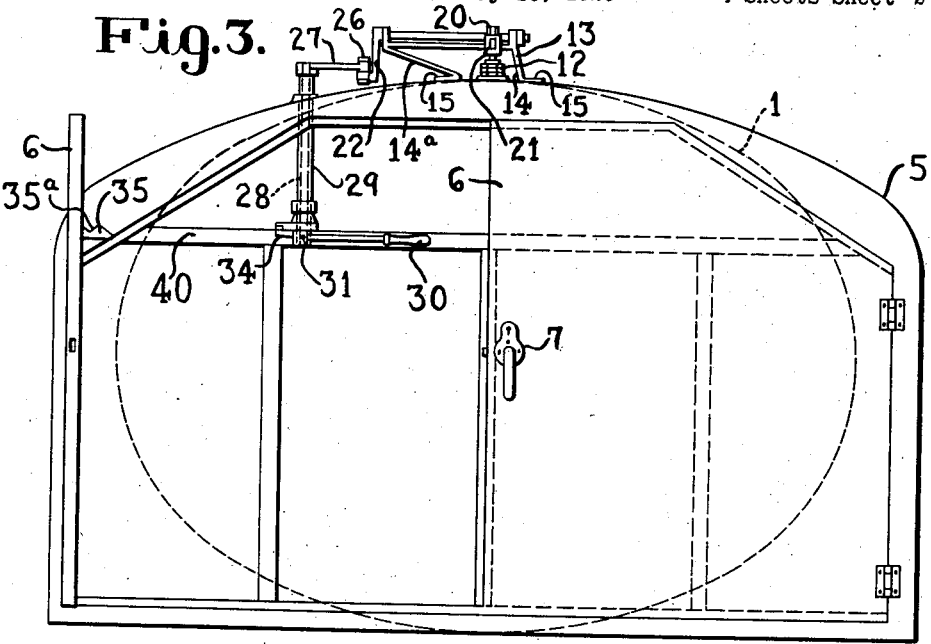
Fig. 3 is a rear elevation looking at the bucket-box with one of its two doors closed and the other open.

The drawing illustrates an elongated tank 1, of the kind adapted to be secured upon the frame or mounting of a vehicle (not shown). The tank illustrated has three compartments 1ª, 1ᵇ and 1ᶜ having manholes or filling openings 2 in the top and outlets 3 in the bottom. From the latter pipe lines 4 extend rearward to the usual dispensing faucets 4ª at the back end of the vehicle, below the tank and bucket-box.

At the rear end of the tank is a bucket-box 5, which may be secured to the tank or separately supported upon the vehicle. The bucket-box is closed at the top, sides, bottom, and front, and is provided with a suitable door or doors 6 at the rear. For purpose of illustration double doors, hinged at the sides and meeting at the middle, are shown, but other types of door are familiar and the invention is applicable equally thereto. The door is provided with a lock 7.

Each of the bottom outlets 3 is adapted to be closed by a vertically-movable downwardly-seating emergency valve 8. The valves are preferably and most advantageously of the kind disclosed in our Patent No. 1,284,063, granted November 5, 1918, and include springs 9 whereby they are instantaneously closed or caused to close upon the release of means holding them open. The articulated, flexible valve rod connections 10, with the upper section 11 of each passing through a stuffing-box guide 12 in the top of the tank, are similar to what is disclosed in the said patent.

A bracket 13 is secured on top of each of the compartments of the tank, adjacent the vertical rod member 11. Each of said brackets comprises side limbs 14, 14ª having bent feet 15 united to the shell by welding or otherwise, and a transverse top member 16 containing a perforation 17 forming an additional guide for the upper end of the rod. A transverse rock-shaft 18 is journaled in forwardly projecting bearing arms 19 and 19ª on the side portions of the bracket. The bottom attaching portions 15 of both limbs of the bracket are preferably located near the longitudinal center of the top of the tank, at opposite sides of the stuffing-box 12, and the limb 14ª is inclined laterally outward and upward so as to carry the bearing arm 19ª a substantial distance to one side of the valve rod connection. The shaft 18 has secured to it, between the side portions of the bracket and in or adjacent the vertical longitudinal plane of the valve rod connection, a rearwardly or substantially horizontally projecting arm 20, the end of which engages within a yoke 21 forming a part of the valve rod member 11 between the stuffing-box 12 and the top member 16 of the bracket. On the remote portion of said rock-shaft, adjacent the bearing arm 19ª, is a depending or substantially vertically extending arm 22. The arms 20 and 22 and the shaft 18 form a bell-crank, whereof movement of the arm 22 rearwardly of the tank will raise the arm 20 and thereby lift and unseat the connected emergency valve 8 against the action of its spring 9. These parts are duplicated for each of the compartments of the tank, and in connection with each of the valves.

Each of the arms 22 is pivotally or otherwise flexibly connected at its lower end with a clamp block 23 comprising members which can be fixed by screws 24 at any point lengthwise on a rod 25 which passes lengthwise over the top of the tank at one side of the longitudinal center. The rod 25 is thus connected with the several valve bell-cranks, with capacity for relative adjustment therebetween.

Figure 4:
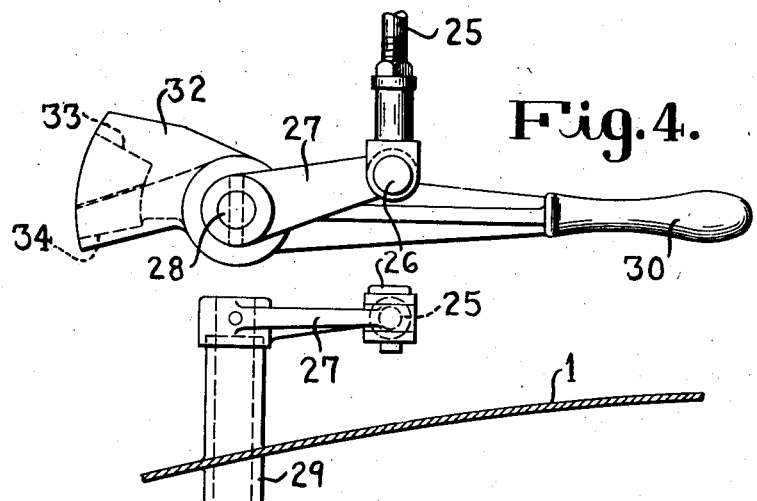
Fig. 4 is a plan view of the operating parts at the end of the tank, with the bucket-box omitted, the parts being shown in the position corresponding to the closed condition of the emergency valves.
Figures 5, 6:
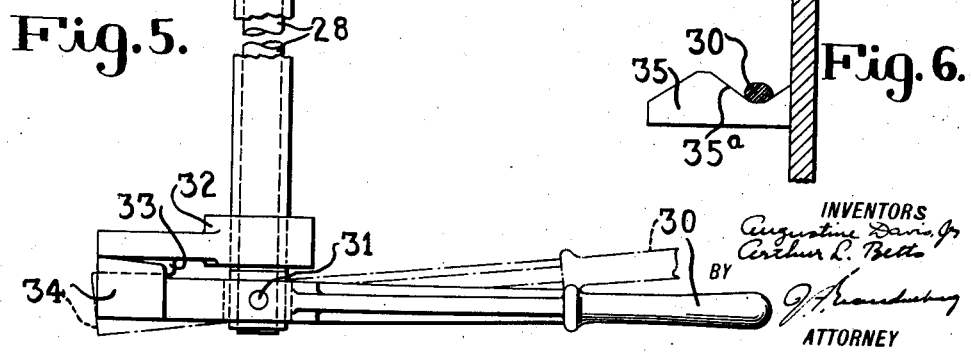
Fig. 5 is a fragmentary section through the top of the bucket-box, with the operating connections of Fig. 4 in elevation, with the intermediate portion of the vertical rock-shaft and its bracket sleeve broken away, and with the tilted position of the lever handle indicated by dotted lines.
Fig. 6 is a detail illustrating the cooperation of the lever handle and cam.
Figure 10:
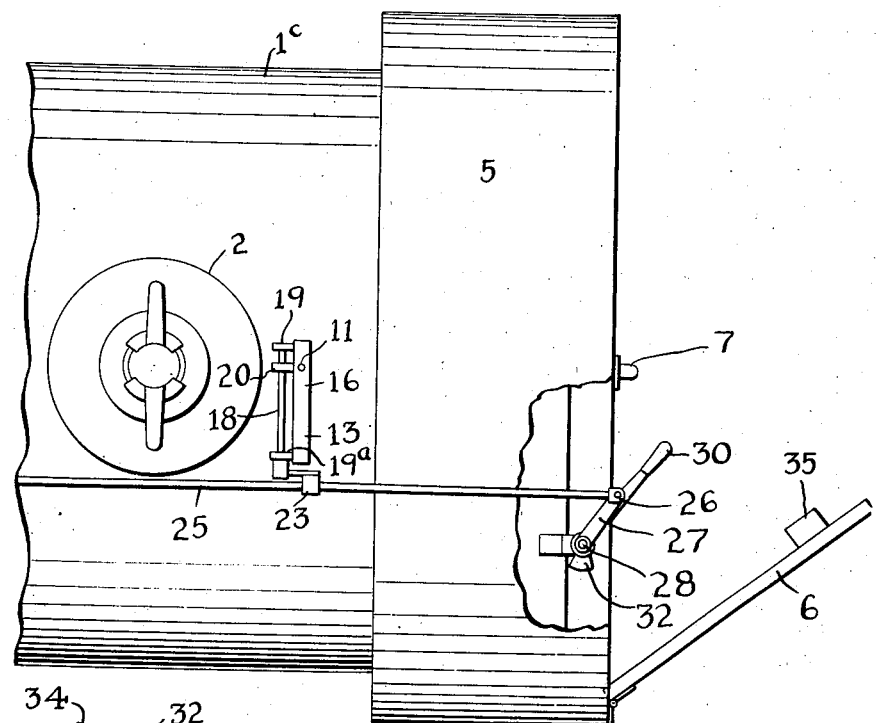
Fig. 10 is a plan view, partially broken away, of the rear portion of Fig. 1, showing the bucket-box door open and the valve-lever pulled out and held in the position which corresponds to the open condition of the emergency valves.
Figure 11:
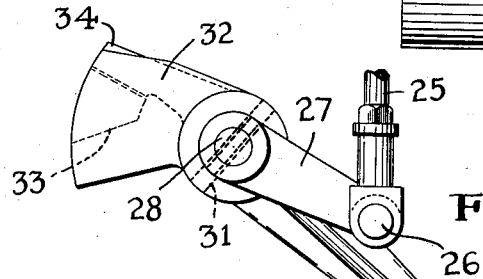
Fig. 11 is a view like Fig. 4, but showing the operating parts in the position corresponding to the open condition of the valve.
Figure 12:
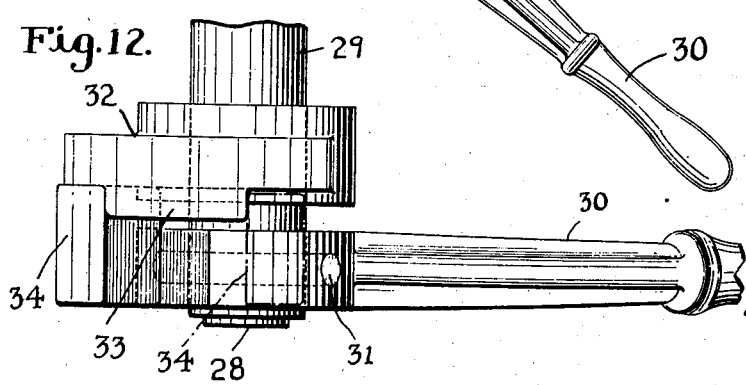
Fig. 12 is an end elevation of the parts of Figs. 4 and 11, indicating the two positions by full and broken lines.

At the rear, the longitudinally movable rod 25 passes over the top of the bucket-box 5, where its rear extremity is pivotally connected at 26 with a crank arm 27, which is fixed upon the upper end of a vertical rock-shaft 28. Said vertical rock shaft 28 passes downward through the top of the bucket-box within the sleeve 29 of a bracket, which is secured to said top and to an internal shelf 40. On the lower end of the vertical shaft is the terminal member of the valve-operating connection, comprising preferably a generally horizontal lever handle 30. This handle is connected to the shaft by a transverse pivot 31, whereby it turns with and causes turning of the shaft, and is also capable of tilting vertically, that is to say longitudinally, with reference to the shaft. The lower portion 32 of the bracket, which includes the sleeve 29, projects laterally and bears a holding lug 33 upon its under side, this lug cooperating with a tail 34 on the lever. The handle 30 is thus located within the bucket-box inside the door 6, and the proportions and relations are such that the handle is moved outwardly and rearwardly of the door opening, to open the valves in the bottoms of the compartments of the tank. In this condition the tail 34 of the lever is caught at one side of the lug or fixed catch member 33, as seen in Fig. 11, so as positively to hold the valves open against the effort of their springs tending to close them and to restore the operating connections to normal position. In order to close the valves the handle must be moved forwardly within the bucket-box away from obstructing relation to the door 6. In this position the tail 34 is caught at the opposite side of the lug 33, (see Fig. 4) whereby the valves are positively locked in their closed position against any attempt to open them by manipulation of the external connections. The weight of the body of the handle tends to tilt the lever about the pivot 31, so as to hold the tail 34 up against the bottom of the bracket portion 32 in cooperative relation to the lug 33, at one side or other thereof. A cam 35, fixed to the inner side of the door so as to be operated thereby, rides under and lifts the lever 30 when the door is moved toward its closed position. Thereby the tail 34 is moved downward in the position of Fig. 11, so as to clear the lug 33, whereupon either by the further inward movement of the door or by the action of the springs 9, or both, the valves and operating mechanism are moved to the closed condition, preventing passage of oil or gasoline from the tank compartments to the several pipe lines 4. The lever is swung in this operation to the position of Fig. 4, where the weight of the body of the lever automatically tilts it, and causes it to lock behind the lug 33, in the position of Fig. 4. When the door of the bucket-box is closed and locked, it is impossible to remove any of the contents of the tank, except possibly by dipping out through the manholes. In order to open the emergency valves, the door of the bucket-box must be unlocked and opened and the handle 30 then grasped and tilted so that its tail clears the lug 33 and then pulled outward through the door opening, in which position it is held with the valves open, as explained, because the weight of the lever causes it to be caught in front of the lug (Fig. 11).

While the foregoing is the preferred and simple construction affording an interlock or cooperating relation between the valve mechanism and the bucket-box door whereby the valves must be closed when the box is closed and are secured by the same lock which secures the door, numerous other embodiments will suggest themselves to the skilled mechanic, and we accordingly do not limit ourselves to the precise arrangements shown.

Fig. 9 shows an application of the valve-operating mechanism wherein the connections run to the front end of the tank, where the handle 30ª can be operated from the cab.

What we claim as new is:

1. The combination with a vehicle tank having an outlet, and a box having a door, of a valve adapted to close the outlet, operating connections passing from the valve to the box, a catch cooperative with a member of said connections to hold the valve open, and means whereby closing of the door disengages said member from the catch.

2. The combination with a vehicle tank having an outlet, and a box having a door, of a valve adapted to close the outlet, operating connections passing from the valve to the box, a catch cooperative with a member of said connections to hold the valve open, and a cam operated by the door in closing to disengage said member from the catch.

3. The combination with a vehicle tank having an outlet, and a box having a door, of a valve adapted to close the outlet, operating connections passing from the valve to the box and therein terminating in a rock-shaft and a lever handle pivotally connected to said shaft, a stationary holding lug cooperative with the lever, and a cam operated by the door for tilting the same to free it from the lug.

4. In combination with a vehicle tank provided with an outlet, and a box at the end of the tank having a door, a valve commanding said outlet, a connection passing upward from the valve through the top of the tank, a longitudinally movable control rod connected therewith and extending lengthwise over the top of the tank, a vertical rock-shaft the upper end of which is connected to the rear end of said control rod, said rock-shaft passing downward into the box, and a lever connected with said rock-shaft within the box.

5. The combination with a vehicle tank having an outlet, and a box having a door, of a valve adapted to close the outlet, operating connections passing from the valve to the box, a vertical rock-shaft in the box to which said connections are connected, a lever handle pivotally connected to said shaft so as to be tiltable up and down relatively to the shaft, and a stationary holding lug cooperative with the lever.

AUGUSTINE DAVIS, JR.
ARTHUR L. BETTS.